United States Patent Office 3,530,523
Patented Sept. 29, 1970

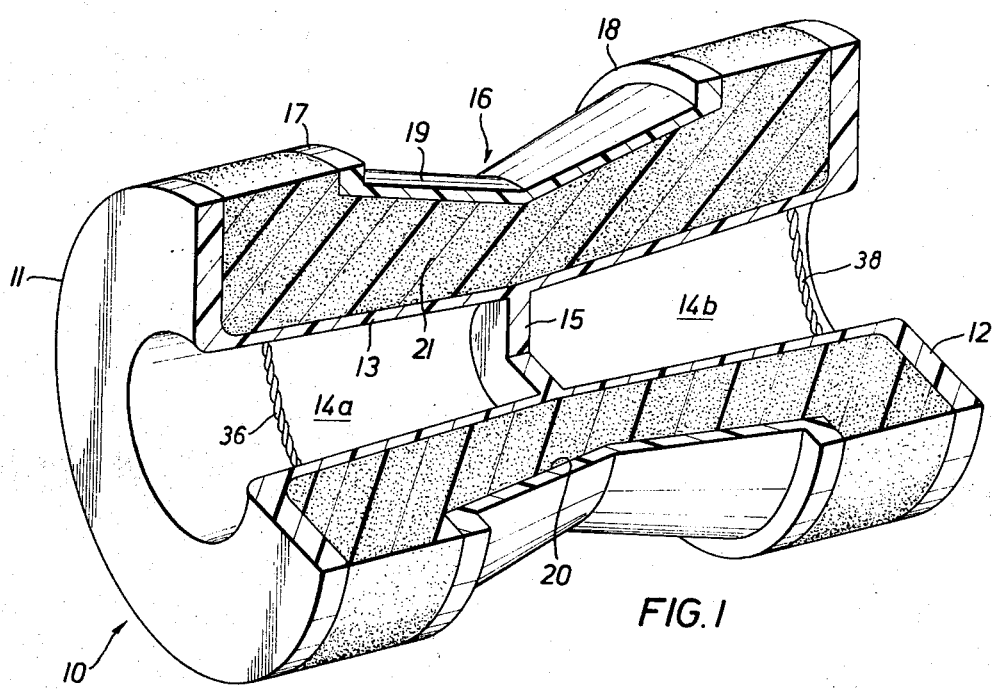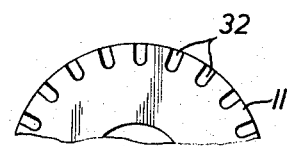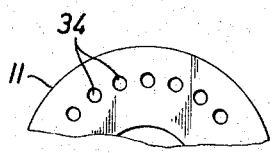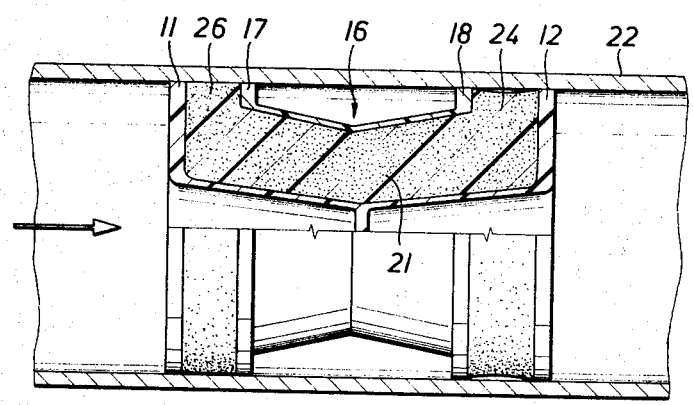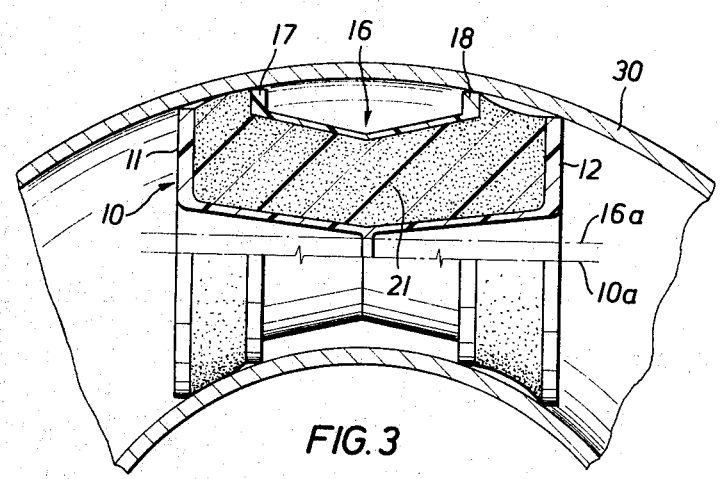

3,530,523
PIPELINE PIG
Burton Ver Nooy, Broken Arrow, Okla., assignor to
T. D. Williamson, Inc., Tulsa, Okla.
Filed Nov. 18, 1968, Ser. No. 776,373
Int. Cl. B08b 9/04
U.S. Cl. 15—104.06                                    8 Claims

ABSTRACT OF THE DISCLOSURE

The pig has first and second spool-shaped members, both of which have end flanges. The members are arranged with the first extending through the second with the end flanges of the first positioned beyond and spaced from the end flanges of the second. The space between the members is filled with an open cell type of urethane foam that permits limited relative movement of the two spool-shaped members. Relative movement of the two members, as the pig is forced through the line, compresses the foam between the two trailing flanges which forces it outwardly into sealing engagement with the pipeline. The foam between the two leading flanges, however, is placed in tension and is pulled away from the walls of the pipeline. Reversing the position of the pig or its direction of travel reverses the conditions of the foam between the flanges.

---

This invention relates to pipeline pigs generally and, in particular, to pigs that are bi-directional.

A bi-directional pig is one that can be moved through the pipeline in either direction, i.e., either end can precede the other and the pig will function in the same manner.

A pig is used to either clean a pipeline or to divide two fluids moving through a line. The latter use is common where different products are pumped through a pipeline in batches. By placing a "batching" pig behind each batch of a given product, mixing of the products is held to a minimum. A batching pig moves along through the line between the two fluids in light sealing engagement with the inside walls of the pipeline. A cleaning pig is also in engagement with the inside walls of the pipeline so in either application wear takes place on the sealing surfaces of the pig.

Pigs made of a spongy material, such as foamed plastic, have been used as both batching plugs and for light cleaning. They have also been used to purge a pipeline, such as pushing water out of a line ahead of a gas stream after the line has been hydrostatically tested. Such pigs have the advantage of being considerably lighter than other types of pigs of the same size. This reduces their hauling and handling costs. This type pig is also cheap enough to allow it to be thrown away after it has been used. This eliminates the need to clean and store the pig after each use, which is an additional savings.

It is an object of this invention to provide an improved foam plastic type of pig that is bi-directional.

It is another object of this invention to provide a foam plastic type pig having two axially spaced sealing surfaces in which only the trailing sealing surface is in sealing engagement with the pipeline thereby permitting a new sealing surface to be placed in service simply by turning the pig around or by changing its direction of travel.

It is another object of this invention to provide a pipeline pig that can pass through curved sections of the pipeline easily and without losing sealing contact with the inner wall of the pipeline.

These and other objects, advantages, and features of this invention will be apparent to those skilled in the art from a consideration of this specification, including the attached drawings and appended claims.

The invention will now be described in detail in connection with the attached drawings in which:

FIG. 1 is an isometric view of the preferred embodiment of this invention shown in quarter section;
FIG. 2 is a quarter sectional side view on a reduced scale of the pig of FIG. 1 traveling through a pipeline;
FIG. 3 is a view similar to FIG. 2 showing the pig of FIG. 1 passing through a curved section of a pipeline; and
FIG. 4 and FIG. 5 are end views of alternate embodiments of the pig of FIG. 1.

The pig includes first spool-shaped member 10, which includes circular end flanges 11 and 12 and center section 13. The center section has a central passageway through it that is divided into two sections 14a and 14b by partition 15.

Encircling center section 13 of the first spool-like member are annular members 17 and 18. In the embodiment shown, these members are connected by center section 16a to form second spool-shaped member 16. Center section 16a has central opening 20 through which the center section of member 10 extends. Preferably, members 10 and 16 are made of molded rubber or plastic. The material used should have sufficient strength to hold its shape under the loads to be imposed on the pig in service yet have sufficient resiliency to yield as required to conform to the pipe which may be out-of-round in places and which will probably not be of uniform diameter.

Since the members are symmetrical, they are molded in two pieces along either longitudinal or transverse central axes. They are then assembled as shown by attaching the two halves of each together with any appropriate adhesive.

After members 10 and 16 are assembled, resilient means of foam spongy type material, such as foamed polyurethane or the like, is placed in the space between and is bonded to flange 11 and annular member or flange 17 and between flange 12 and annular member or flange 18 at opposite ends of members 10 and 16. In the embodiment shown, the minimum diameter of opening 20 in the second member is such that there is substantial space between center sections 13 and 19 of the two members. Preferably, this space along with the space between the end flanges of the two members is completely filled with the spongy foam material to form body 21 of foam-like material, which is also spool-shaped in configuration.

Foamed polyurethane is preferred for body 21. Whichever foamed material is used, however, it should be of the open cell type, i.e., there should be very little if any trapped bubbles of gas within the body of foam material. This is important, for otherwise, the material would collapse when subjected to pipeline pressures. Open cell type foam material has porosity but it is sufficiently dense, when forced into engagement with the inside surface of the pipeline, to form a sliding seal with the inside wall of the pipeline that is sufficient for the pig to serve as a batching or light cleaning pig.

As shown in FIGS. 2 and 3, the outside diameter of flanges 11, 12, 17 and 18 are substantially equal to the inside diameter of pipeline 22. When the pig is pushed to the right, as viewed in FIG. 2, by a differential pressure existing across it, flanges 17 and 18 on the second spool-like member will drag against the inside wall of the pipeline. The drag on these flanges will tend to cause them to move rearwardly toward flange 11. Flange 18, the forward flange on the second member, will, therefore, place annular end portion 24 of the body of foam material in tension. Conversely, flange 17, as it drags on the inside wall of the pipe, will move rearwardly and compress portion 26 of the foam material located between flange 17 and flange 11. This will force the foam material between these flanges outwardly into firm engagement with the inside wall of the pipeline to maintain a good sliding seal between the pig and the pipeline. In the embodiment shown, flanges 17 and 18 are connected so movement of one is transmitted to the other. The same effect could be obtained even if they were not connected, but the tension and compressive stresses in the foam would not necessarily be the same. Therefore, preferably they are connected.

Polyurethane foam is stronger and more wear resistant when under compression than when under tension. Therefore, the arrangement of this pig also results in the polyurethane foam being forced into engagement with the pipeline under the best circumstances. Further, portion 24 is held out of engagement with the inside surface of the pipeline and suffers no wear as long as the pig is moved to the right, as shown in FIG. 2. This allows the pig to be turned around and an equal amount of life obtained from it after portion 26 of the foam has been worn away to the point that it will no longer function as a sealing surface. Also, should the pressure differential change across the pig so that the pig is moved to the left in the pipeline, as viewed in FIG. 2, portion 24 will be placed in compression due to the relative movement of the first and second spool-shaped members and forced into sealing engagement with the pipe. At the same time, portion 26 will be pulled out of rubbing contact with the pipe.

An additional feature of the pig constructed in accordance with this invention is shown in FIG. 3. The first inner member and second outer member are unconnected except through body 21 of foam material. Therefore, the members can move outwardly and inwardly relative to each other as required for their flanges to negotiate curved sections in the pipeline. For example in FIG. 3, flanges 17 and 18 on the second member have moved upwardly with respect to flanges 11 and 12 to remain in contact with the walls of curved section 30 of a pipeline. In other words, second outer member 16, whose centerline is indicated by line 16a, can move laterally relative to first central member 10, whose centerline is indicated by the number 10a as the pig moves through a curved section of the pipeline. The relative lateral and longitudinal movement of the first and second members is limited, of course, by the compressibility and stretchability of the foam material positioned between and bonded to the two members.

If the pig is to be used to clean a pipeline, it is considered helpful to either cut notches in flanges 11 and 12, such as notches 32 shown in FIG. 4, of to cut holes, such as shown in FIG. 5. The purpose of these openings is to expose more of the surface of the sponge-like foam material to allow a small amount of the fluid in the line to pass through the foam material. This fluid would carry dirt removed from the pipe into the pig, where it would be filtered out and retained by the foam material.

Ropes 36 and 38 extend across passageway sections 14a and 14b, respectively, to provide handles for use in carrying and positioning the pig. The ends of the ropes extend through openings (not shown) in the center section of member 10 and are tied in a knot.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A pipeline pig comprising a spool-shaped central member having spaced, circular end flanges with a diameter approximately equal to the inside diameter of the pipeline in which the pig is to be used and a central section extending between and connecting the two end flanges to hold the flanges in spaced, parallel relationship, a body of foam polyurethane or the like encircling the spool-shaped member between its end flanges, said body having circular flange-like portions adjacent to the end flanges, said portions having a diameter approximately equal to that of the end flanges, and two spaced annular members, each located adjacent and attached to one flange-like portion of the body and on the opposite side thereof from the associated end flange of the spool-shaped member and attached thereto, said annular members having a diameter approximately equal to the end flanges to cause the forward member to drag sufficiently on the walls of a pipeline to place in tension the foam material of the body between the forward end flange and the forward annular member thereby tending to pull the foam material between them away from the pipeline while the rearward annular member drags against the pipeline and compresses the foam material between it and the rearward end flanges of the spool-shaped member forcing the foam material radially outwardly into firm engagement with the inside surface of a pipeline.

2. The pipeline pig of claim 1 further provided with a means connecting the two spaced annular members to transmit axial movement of either of the annular members to the other.

3. The pipeline pig of claim 2 in which the means connecting the two annular members hold the members in fixed spaced relationship.

4. The pipeline pig of claim 3 in which the spool shaped central member, the annular members, and the means connecting the annular members are made of polyurethane.

5. A pipeline pig comprising a spool-shaped member having an elongated center section and attached circular end flanges of a diameter approximately equal to the inside diameter of the pipeline in which it is to be used, an annular member encircling the spool shaped central member between the flanges with its ends spaced from the flanges, said annular member having a central opening through which the center section of the spool shaped member extends, resilient means of sponge-like foam material, such as open cell foamed polyurethane and the like, encircling the central section and filling the space between the end flanges and the ends of the annular member, said annular member having at least one portion with a diameter such that the member will tend to be moved rearwardly by the drag on the inside of a pipeline when the pig is forced through a pipeline to place in tension the foam material between the forward end of the annular member and the forward end flange of the spool shaped member to tend to hold it way from the inside surface of the pipeline and to compress the foam material between the rearward end of the annular member and the rearward end flange of the spool-like member to tend to force the material outwardly into firm contact with the inside surface of a pipeline.

6. The pipeline pig of claim 5 in which the opening through the annular member in which the central section of the spool-shaped member is located is larger in diameter than said central section and the space between the central section and the annular member is filled with said resilient means to permit the annular member and the spool-shaped member to move laterally relative to each other as required when the pig passes through a curved section of a pipeline.

7. A pipeline pig comprising first and second spool-shaped members, each having spaced, parallel end flanges connected together by a central section, the flanges having approximately the same diameter as the inside of the pipeline through which the pig is to travel, said second spool-shaped member having a central axial opening through which the central section of the first spool-shaped member extends with the end flanges of the first member extending beyond and spaced from the end flanges of the second member, said opening through the second spool-like member being substantially larger than the diameter of the central section of the first member extending through it, a body of resilient foam material, such as open cell type foamed polyurethane or the like, filling the space between the two spool-like members to permit limited relative movement between the first and second members.

8. The pig of claim 7 further provided with openings extending through the forward end flange of the first spool-like member to expose more of the foam material to the fluid ahead of the pig.

References Cited
UNITED STATES PATENTS

| | | | |
|---|---|---|---|
| 1,547,440 | 7/1925 | Penn | 15—104.06 |
| 2,188,959 | 2/1940 | Schaer | 15—104.06 |

EDWARD L. ROBERTS, Primary Examiner